United States Patent
Dragone

(10) Patent No.: US 8,204,346 B2
(45) Date of Patent: Jun. 19, 2012

(54) OPTICAL ROUTER WITH NEARLY IDEAL PERFORMANCE

(76) Inventor: Corrado Pietro Dragone, Little Silver, NJ (US)

(*) Notice: Subject to any disclaimer, the term of this patent is extended or adjusted under 35 U.S.C. 154(b) by 304 days.

(21) Appl. No.: 12/592,179

(22) Filed: Nov. 21, 2009

(65) Prior Publication Data

US 2011/0123148 A1    May 26, 2011

(51) Int. Cl.
*G02B 6/26* (2006.01)
(52) U.S. Cl. ................ 385/24; 385/31; 385/37
(58) Field of Classification Search .......... 385/22, 385/24, 31, 37
See application file for complete search history.

(56) References Cited

U.S. PATENT DOCUMENTS

| | | | |
|---|---|---|---|
| 5,002,350 A | 3/1991 | Dragone | |
| 5,136,671 A | 8/1992 | Dragone | |
| 5,488,680 A | 1/1996 | Dragone | |
| 6,560,380 B2* | 5/2003 | Huang et al. | 385/15 |
| 6,608,948 B2* | 8/2003 | Delisle et al. | 385/24 |
| 6,873,766 B2 | 3/2005 | Dragone | |
| 6,952,512 B2* | 10/2005 | Parker et al. | 385/39 |
| 6,956,993 B2* | 10/2005 | Bernasconi | 385/37 |
| 7,010,197 B2 | 3/2006 | Doerr | |
| 7,068,888 B1 | 6/2006 | Dragone | |
| 7,283,700 B2* | 10/2007 | Dragone | 385/24 |
| 2002/0154861 A1* | 10/2002 | Nara et al. | 385/37 |
| 2002/0159675 A1* | 10/2002 | Huang et al. | 385/15 |

* cited by examiner

*Primary Examiner* — Charlie Peng

(57) ABSTRACT

An optimized planar optical router consisting of two stages performing stationary imaging between an input waveguide and a set of output waveguides has advantages of reduced size, larger number of channels and minimal loss variation in each passband. Each stage is a waveguide grating router, the two stages are characterized by nearly equal free-spectral ranges, and a waveguide lens is connected between the two stages. In one embodiment, the lens is connected between the central zones of the two stages, and the diffraction orders of the two stages vary monotonically from each passband to the next. In another embodiment, the loss caused by secondary images is substantially reduced by using a composite lens providing efficient transmission of both principal and secondary images.

7 Claims, 9 Drawing Sheets

$$\Omega = \Omega'(1 - \frac{1}{r})$$

though to US 8,204,346 B2

OPTICAL ROUTER WITH NEARLY IDEAL PERFORMANCE

FIELD OF THE INVENTION

This invention relates to optical frequency routers in optical systems and, more particularly, to optical routers with maximally flat passbands.

BACKGROUND OF THE INVENTION

An important function that must be provided in optical networks is wavelength routing. In particular, wavelength routing is needed at each node, in order to combine and separate different wavelength channels. Typically, the router is realized in integrated form by using a waveguide grating, and an example is shown in FIG. 1. The router in this example only includes one input waveguide and its purpose is to separate the input channels, and transmit them to different output waveguides. The waveguide grating simply transforms each input signal, intended for a particular output waveguide, into a corresponding output image produced (approximately) at the output waveguide location. However, an undesirable feature of this router is its narrow bandwidth, caused by the strong wavelength dependence of each image location produced by the grating. Because of this variation, maximum transmission to a particular output waveguide is only possible in the immediate vicinity of the center wavelength of the corresponding passband.

In order to eliminate this problem, one must use a planar arrangement of two gratings of opposite dispersions as shown previously in U.S. Pat. No. 5,488,680 which issued on Jan. 30, 1996, U.S. Pat. No. 7,010,197 B2 which issued on Mar. 7, 2006, and U.S. Pat. No. 7,283,700, which issued on Oct. 16, 2007. By this technique, each output image becomes stationary at the location of the corresponding output waveguide, thus producing a maximally flat transmission coefficient. However, an undesirable feature of this imaging arrangement is its large size. In particular, the second patent requires between the two gratings many waveguide lenses, one for each output waveguide, and therefore this design is only feasible if the number N of output waveguides is small. On the other hand, only one lens is required by the third patent, but an undesirable feature in this case is that the output waveguides are widely spaced (as shown in a following section) and this increases again the size of the router. Furthermore, in both patents, the size of the router further increases if the required width of each channel must be nearly equal to the channel spacing. Accordingly, here the above problems are substantially reduced by using a new design that has advantages of increased number of channels, reduced size, and improved performance.

SUMMARY OF THE INVENTION

The primary objective of the present invention is the realization of an optical router with improved transmission properties, reduced size, increased number of channels and maximally flat passbands.

The new router is a new imaging arrangement including two stages (two waveguide grating routers) having opposite dispersions, nearly identical free-spectral ranges, and one or more waveguide lenses connected between the two stages.

In one embodiment, a single lens is connected between the central zones of the two stages, and the lens apertures approximately cover the entire widths of the two central zones. In a second embodiment, the losses caused by secondary images are substantially reduced by also including two secondary lenses. A new design feature is that the router passbands, transmitted from a particular input waveguide to the various output waveguides, are characterized by different orders of the two gratings, and said orders vary monotonically (they either increase or decrease) from each passband to the next. Significant advantages of increased number of channels and improved performance are realized in both cases.

BRIEF DESCRIPTION OF THE DRAWINGS

In the drawings.

In the following description, identical element designations in different figures represent identical elements. Additionally in the element designations, the first digit refers to the figure in which that element is first located (e.g., 108 is first located in FIG. 1).

DETAILED DESCRIPTION

Waveguide Grating Router

Figure 1:
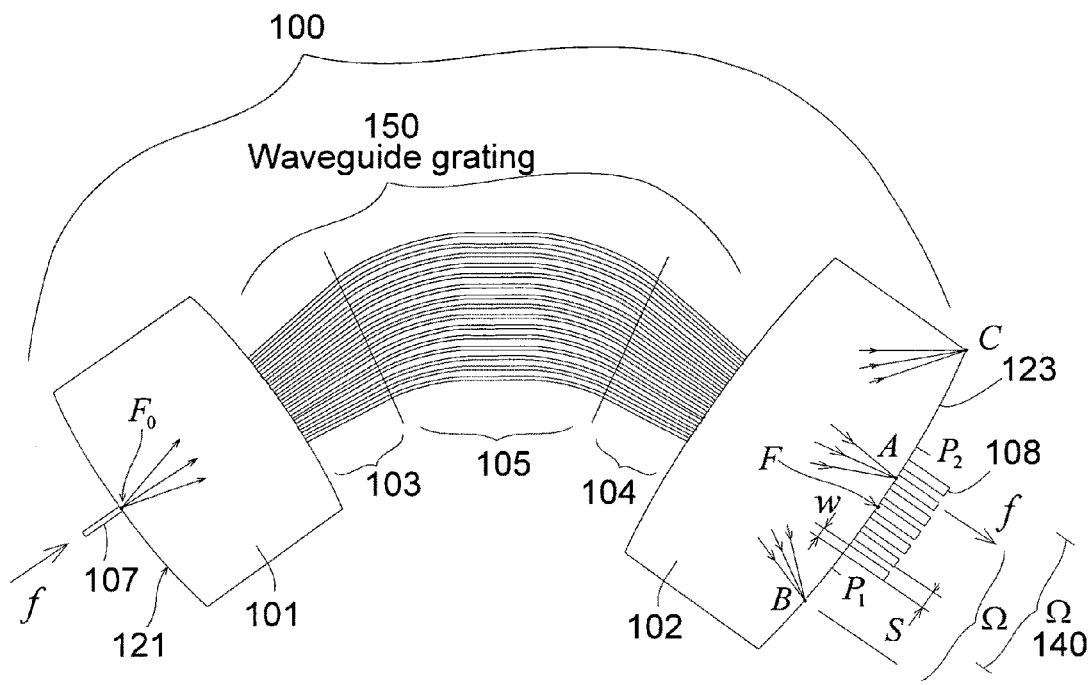
FIG. 1 illustrates the basic prior art geometry of a waveguide grating router. Also shown, by the bottom insert, is the mode $\phi(x)$ of a typical waveguide. The effective width $w_\phi$ of the mode determines the minimum spacing S of adjacent output waveguides of width w.
Figure 1:
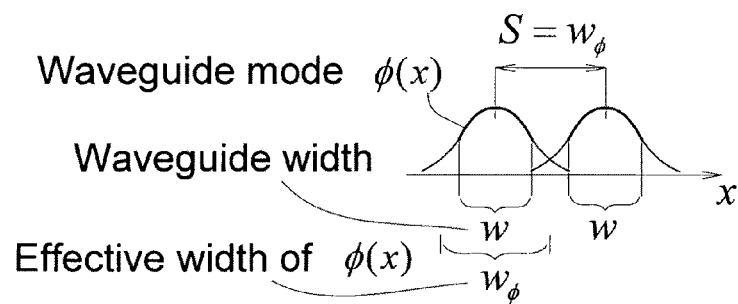

FIG. 1 shows the basic structure of a prior art imaging arrangement 100 of the type used in this invention. Note the imaging arrangement will also be referred to herein as a router. The imaging arrangement 100 is described in U.S. Pat. No. 5,002,350, issued on Mar. 26, 1991, and U.S. Pat. No. 5,136,671, issued on Aug. 4, 1992, The imaging arrangement 100 includes an input section 101 and an output section 102 spaced apart and interconnected by a grating 150 consisting of an appropriate plurality of optical waveguide arms 105 connected between two periodic arrays 103,104 of radial waveguides. The input and output sections typically are each free-space slabs, such as star couplers, and the arrangement has the property that wave energy applied by an input waveguide 107 acting as a point source forms a plurality of output images, of which three are shown as A, B, C in FIG. 1. The optical waveguide arms 105 typically are thin narrow layers (planar strips) of silica core supported on a planar silicon wafer, as known in the art.

In a conventional imaging arrangement or router, the input and output ports are connected to the input and output sections 101 and 102 along portions of two curves, that contain the input and output foci $F_0$ and F of the grating, and they are typically referred to as the input 121 and output 123 focal curves (circles) of the router. For simplicity, FIG. 1 shows only one input 107 and several output 108 ports.

The result is a router that produces a frequency dependent output image of each input signal. The location of each output image is determined by its frequency f and, therefore, signals of different frequencies from a particular input port give rise to separate images that can be received by different output ports. Typically, optical fibers are used for applying input signals to the input ports and for extracting output signals from the output ports 108. Several output ports are needed in order to transmit signals to different destinations. Similarly, several input ports may be needed, in order to receive signals from different input fibers. In frequency division optical networks, the different frequencies would represent different communication channels.

The properties of the arrangement of FIG. 1 are best described next by considering its imaging properties in response to an input signal of variable frequency f applied to the input waveguide 107. The input signal in FIG. 1 is radiated from the waveguide location towards the receiving apertures of the radial waveguides 103 connected to the arms 105 forming the grating 150. As discussed earlier, there would be an appropriate number of arms in the grating 150. At a particular input frequency, each arm receives a component of the input signal. The signal is therefore split into many components, each traveling along a particular arm. Each arm applies to its component an appropriate phase shift, which is frequency dependent, and it is proportional to the optical path length of the arm. In a conventional router, successive arms are characterized to a good approximation by a constant path length difference. Then, one finds that the various signal components radiated by the arms towards the output curve, all add in phase at certain locations on the output curve 123 shown in FIG. 1. As a result, several images A, B, C of the input signal are produced on the output curve 123. These images represent different orders of the grating and they have three basic properties. First, their locations vary with the frequency f. Second, their intensities also vary, and they are determined by the radiation characteristics of the periodic array 104. Third, the images are equally spaced with spacing Ω determined by the angular spacing a of the array elements, $$\Omega = \frac{\lambda}{\alpha} = \frac{c}{f}\frac{1}{\alpha} \quad (1)$$

where λ denotes the wavelength, approximately equal to a constant c divided by f. Of greatest importance in a conventional router is the central image A of highest intensity. This is the image closest to the focal point F of the arms and it is called the principal image. This image is produced inside the central zone (also known as principal zone) which is an interval 140 of width Ω centered at F. The remaining images (produced by different orders) such as B, C are produced outside the central zone. These secondary images typically have appreciably smaller intensity in all cases except when they are close to the boundaries of the central zone. In a conventional router, all secondary images produced outside the central zone (e.g., B and C of FIG. 1) are considered useless and so undesirable. These unwanted images reduce the power transferred to the principal image and, therefore, they reduce the grating efficiency. In particular, they cause substantial efficiency variation in the central zone $P_1P_2$, particularly in the regions close to the edges $P_1$ and $P_2$. As a consequence, in conventional routers, the output waveguides 108 are located in the central region where the grating efficiency is close to unity.

By using two previous techniques, respectively described in U.S. Pat. No. 7,068,888 issued on Jun. 27, 2006, and U.S. Pat. No. 6,873,766 issued on Mar. 29, 2005, the grating efficiency can be substantially improved by including suitable transitions in the output periodic array 104. By using the first technique, the above central region (characterized by nearly unity efficiency) can be increased to more than 50% of the central zone and, by adding the second technique, it can be increased to about 80%. On the other hand, both techniques increase the output focal length of the router.

Note, since the principal image A is defined as the closest image to the focal point, the central zone width $P_1P_2$ is simply equal to the spacing Ω of the various images. Moreover, an input signal of variable frequency will cause the principal image location to vary cyclically in the central zone, with a discontinuous jump by −Ω occurring from each cycle (each order) to the next.

In a conventional router, all the output ports or waveguides are located inside the central zone 140 (which in FIG. 1 represents the field of view $P_1P_2$ of the router) and receive only the images produced in the central zone. As shown in FIG. 1, the output waveguides 108 are closely spaced, with spacing S slightly larger than the waveguide width w. Note the waveguide spacing determines in FIG. 1 the channel spacing, and it is therefore important to minimize S for a given waveguide width w by choosing for S the smallest possible value, without causing appreciable mutual coupling (crosstalk) between adjacent waveguides. The bottom insert of FIG. 1 shows the modes of two adjacent waveguides. The waveguide spacing S must be large enough to insure negligible mutual coupling, and the smallest S satisfying this condition is determined by the effective width $w_\phi$ of the waveguide mode $\phi(x)$.

The input signal in FIG. 1 is efficiently transmitted to a particular waveguide at those frequencies for which the principal image location A coincides with the waveguide location. As pointed out earlier, A is defined as the particular image inside the central zone $P_1P_2$. Therefore the variation of A is a periodic (cyclic) function of the signal frequency. In each period, the variation exactly covers the entire central zone $P_1P_2$. As a result, the transmission coefficient (to a particular output waveguide) has periodic behavior consisting of equally spaced maxima. Each maximum corresponds to a frequency for which the image A coincides with the output waveguide location. The period, given by the frequency spacing between maxima, is called the free-spectral range. The period has, in general, slightly different values at different locations in the central zone and, therefore, different waveguides in FIG. 1 will be characterized by slightly different periods. In the following, Δf will denote the central period produced, at the center (the focal point F) of the central zone, in response to a signal applied to $F_0$. Then, a waveguide connected to the focal point F is characterized by a set of equally spaced frequencies $f_i$ of maximum transmission. These frequencies, transmitted by the grating from the input focal point $F_0$ to the output focal point F will be called the characteristic frequencies of the grating. Each of these frequencies is determined by a particular order $Q_i$ of the grating, and $$f_i = f_0 + i\Delta f, Q_i = Q_0 + i (i = 0, \pm 1, \ldots) \quad (2)$$

where $f_0$ will be called the center frequency of the grating, $Q_0$ denotes the corresponding order, $\Delta f$ will be called the free-spectral range of the router, and the parameters $\Delta f$, $f_0$, $Q_0$ are related by the well known relation $$\Delta f = \frac{f_0}{Q_0} = \frac{f_i}{Q_i} \quad (3)$$

Another important relation is obtained by considering in FIG. 1 the variation of the output image A as a function of the wavelength. One finds that the wavelength derivative D of the image coordinate is simply equal to $$D = Q\frac{\Omega}{\lambda} \quad (4)$$

where Q is the order of the image and the ratio $\Omega/\lambda$ according to the expression (1) is a constant independent of the signal frequency.

Figure 2:
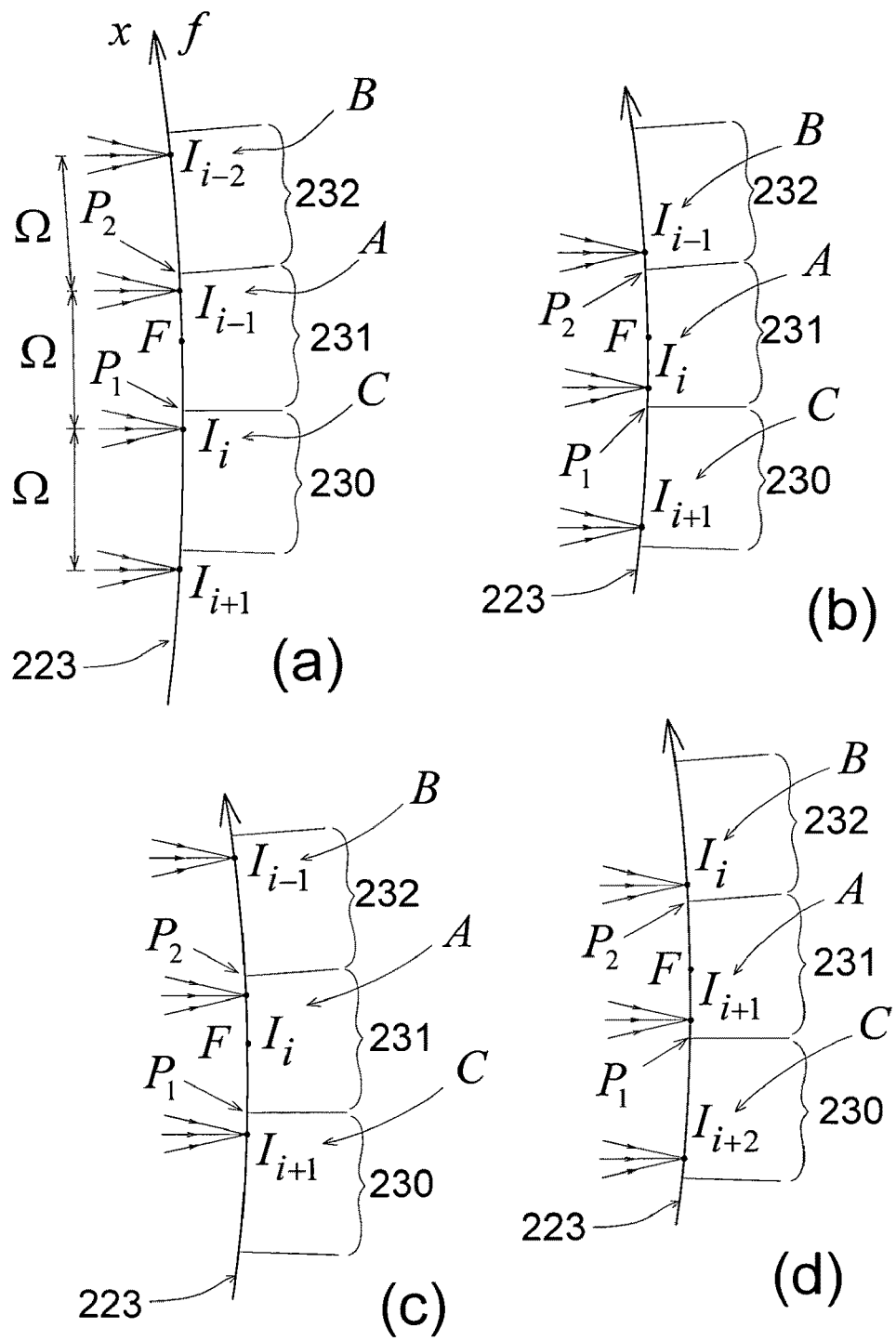
FIG. 2 illustrates the cyclic behavior of the images A, B, C produced in the output zones 231, 232 and 230 of a waveguide grating router.

Next consider the router response to an input signal of variable frequency. FIG. 2 shows four examples (a, b, c, d) of the images respectively produced on the output focal curve 223 by four consecutive frequencies. Note $I_i$ denotes the i-th image of order $Q_i$ and $\Omega$ is the image spacing determined by the angular period $\alpha$ of the periodic array 104. Typically, by optimizing the efficiency of the periodic array 104, most of the signal power is transferred to the principal image A located in the central zone, and the remaining power is primarily transferred to the two secondary images located on either side of the central zone. These three images are respectively located inside three zones 230, 231, and 232 of widths equal to $\Omega$ and they are characterized, in each zone, by cyclic variation. Each cycle is produced by a particular image, of a particular order, and it covers the entire zone. Consider for instance the central zone 231. Initially, in insert (a), the principal image A inside the central zone $P_1P_2$ is produced by the image $I_{i-1}$ of order $Q_{i-1}$, and the image $I_i$ of order $Q_i$ is a secondary image C produced inside the secondary zone 230. However, by increasing the frequency, the image $I_{i-1}$ exits the central zone, thus becoming a secondary image B in the secondary zone 232 as shown by insert (b). At the same time, the secondary image $I_i$ enters the central zone, thus becoming the new principal image. Notice, at the end of each cycle, produced by a particular order, the principal image exits from the central zone at $P_2$ while at the same time a new cycle starts at $P_1$ (see inserts (c, d)). Thus, at the end of each cycle, the principal image A discontinuously jumps from $P_2$ to $P_1$, and a similar behavior occurs in all other zones.

To summarize, the image location in the central zone $P_1P_2$ is a cyclic function of the input frequency. Each cycle is determined by a particular order $Q_i$ of the grating and it covers the entire interval $P_1P_2$. At the end $P_2$ of a cycle, the order $Q_i$ increases by one (thus becoming $Q_{i+1} = Q_i + 1$) and a new cycle starts at the other end $P_1$. Notice, any particular location A in the central zone $P_1P_2$ is periodically revisited by the output image with a constant frequency period.

Note the efficiency (the image intensity) in each zone is a function of the image distance from the focal point F and, as pointed out earlier, its variation is determined by the radiation characteristics of the periodic array 104. As pointed out earlier, the central zone is typically characterized by a central region of nearly maximum intensity, and it is generally advantageous to maximize the width of this region by including suitable transitions in the periodic array. Then, the width of this region will typically varies between 50% and 80% of the central zone. Typically, in a router, the output waveguides are located in the above central region, and therefore their number N is smaller, by a factor $\gamma < 0.8$, than the maximum value $N_{max}$ by the central zone width. Thus in FIG. 1

$$N = \gamma N_{max} \quad (5)$$

where $N_{max} = \Omega/S$ and $\gamma < 1$, and similar relations will apply to the new routers considered here.

Stationary Imaging

Figure 3:
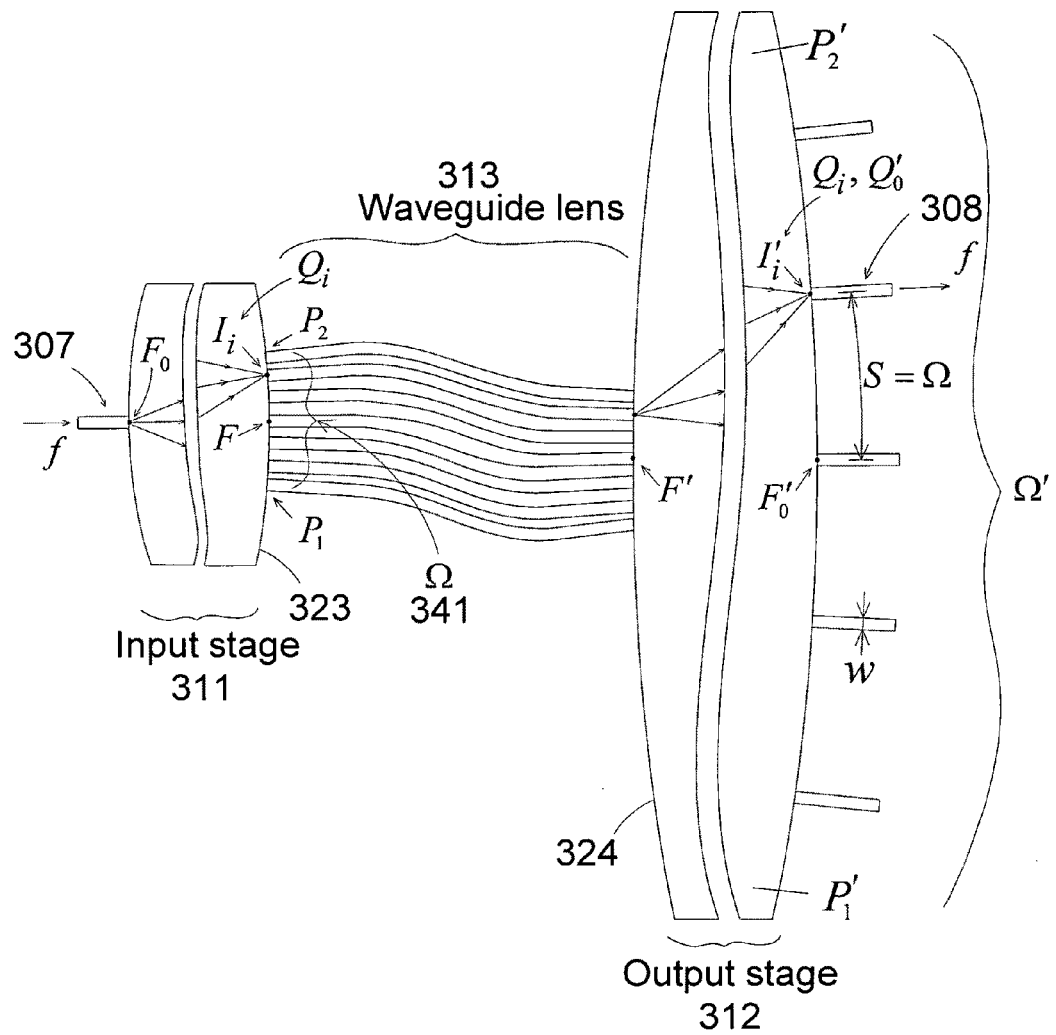
FIG. 3 shows a prior art router featuring a set of widely spaced output waveguides 308, all characterized by the same diffraction order $Q'_0$ of the output stage.

In FIG. 1, the location of each output image is a function of the input frequency, and therefore the router is characterized by substantial loss variation in each passband. It is therefore desirable for many applications to substantially reduce this variation by using the technique described in U.S. Pat. No. 5,488,680 which issued on Jan. 30, 1996, U.S. Pat. No. 7,010,197 B2 which issued on Mar. 7, 2006, and U.S. Pat. No. 7,283,700 B2, which issued on Oct. 16, 2007. By this technique, the above image variation is essentially eliminated by using a combination of two stages characterized by opposite dispersions, and the router then produces, at each output waveguide location, a stationary output image producing a maximally flat response in the output waveguide. However, a limitation of the arrangements described in the above patents is their large size. In particular, the arrangement proposed in U.S. Pat. No. 7,010,197 B2 requires a large number of lenses, one for each output waveguide, and therefore this arrangement is only feasible if the number N of output waveguides is small. On the other hand, U.S. Pat. No. 7,283,700 describes an arrangement using a single lens, as shown in FIG. 3, but an undesirable feature of this arrangement is again its large size, caused in this case by the large spacing of the output waveguides, as discussed next. Note, in the following, a waveguide lens can be viewed as a waveguide grating of zero order. Therefore in FIG. 3 (or FIG. 4) the lens is simply a set of waveguides whose purpose is to provide efficient transmission between the input and output apertures (for instance 441, 442) of the lens.

The prior art arrangement of FIG. 3 consists of two stages 311, 312 and a single waveguide lens 313 connected between the two stages. Each stage is formed by a waveguide grating router, as shown in FIG. 1, and the waveguide lens provides efficient transmission between the focal circles 323 and 324 of the two gratings (not shown). The two stages are essentially characterized by opposite dispersions, and therefore the complete arrangement features a set of stationary output images, produced at the locations of the various output waveguides. In this arrangement the various passbands are all produced by a particular cycle (a particular order $Q'_0$) of the output stage. Thus, the i-th cycle of the first stage produces an image $I_i$ of order $Q_i = Q_0 + i$, and this image is then transferred by the waveguide lens to the second stage, whose cycle of order $Q'_0$ then produces a stationary output image $I'_i$. In this arrangement, the lens aperture 341 is approximately equal to the central zone width $\Omega$ of the first stage. Each cycle of the input stage produces, over the lens aperture, a variable image $I_i$, which is transmitted by the lens to the output stage, which in turn produces an output stationary image $I'_i$ at a particular waveguide location. In this arrangement, since each input cycle in FIG. 3 ends with a discontinuous jump from $P_2$ to $P_1$, the output stationary image correspondingly jumps, at the end of each input cycle, to the next output cycle. This jump, which is determined by the aperture width of the lens, determines the separation S of the output waveguides. As a consequence, since the lens typically includes many waveguides, the output waveguides separation S is substantially larger than the output waveguides width w. As a consequence, an important limitation in FIG. 3 is the large size of the output stage.

Figure 4:
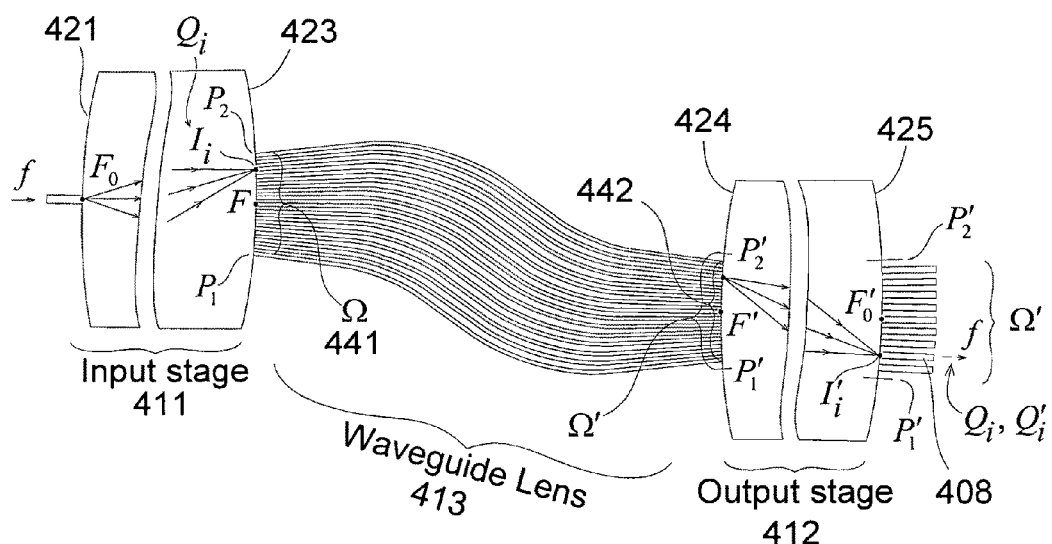
FIG. 4 shows the basic geometry of the present invention. A waveguide lens 413 is included between the two stages, which are characterized by opposite dispersions, and satisfy condition (7). A basic difference from previous arrangements is that the orders $Q_i$ and $Q'_i$ of the two stages increase monotonically from each output waveguide (each passband) to the next.

In the present patent this problem is solved by using a new design that substantially increases the number N of output waveguides, and it also improves the router efficiency. In the new design, the two stages are characterized by nearly equal free-spectral ranges, and a single lens is included between the two stages, and the lens is connected between the principal zones $P_1P_2$ and $P'_1P'_2$ of the two focal curves 423, 424. FIG. 4 shows the simplest embodiment of the present invention. As in the prior art, stationary imaging is realized in two stages 411 and 412, each including a waveguide grating, with a waveguide lens 413 connected between the focal circles 423 and 424 of the two stages. The lens apertures 441 and 442 are respectively centered at the foci F and F' of the two stages, and the purpose of the lens is to accurately produce, on its output aperture 442, a replica of each principal image illuminating the input aperture. Again, as in the previous arrangement of FIG. 3, the i-th cycle of the first stage produces an image $I_i$ of order $Q_i=Q_0+i$, and this image is then transferred by the waveguide lens to the second stage, which then produces a stationary output image $I'_i$ transferred to the i-th output waveguide. The difference, between the new arrangement and the prior art, is that different output images $I'_i$ are now produced by different cycles (different orders $Q'_i=Q'_0+i$) of the output stage. As a consequence, the orders $Q_i$ and $Q'_i$ of the two stages now increase monotonically from the i-th waveguide to the next, whereas in the prior art all output images were characterized by the same order $Q'_0$. Because of this property, it will be shown that the output images $I'_i$ are now closely spaced and, as a consequence, the size of the output stage is substantially reduced as compared to FIG. 3. Note each image will produce a passband transmitted to a particular output waveguide, and different passbands will be produced by different values of both diffraction orders $Q_i$, $Q'_i$.

The basic difference between the new arrangement and the prior art arrangement of FIG. 3 is in the value of the parameter $$q = \frac{\Delta f'}{\Delta f} \qquad (6)$$

where $\Delta f'$ and $\Delta f$ denote the free-spectral ranges of the two stages. In FIG. 3, the above parameter is approximately equal to the number N of output waveguides. Instead, in the arrangement of FIG. 4, the above parameter is close to unity and it is related in a simple way to the number N of channels, namely $$q \simeq 1 + \frac{\gamma}{N} \quad (0 < \gamma < 1) \qquad (7)$$

Figure 6:
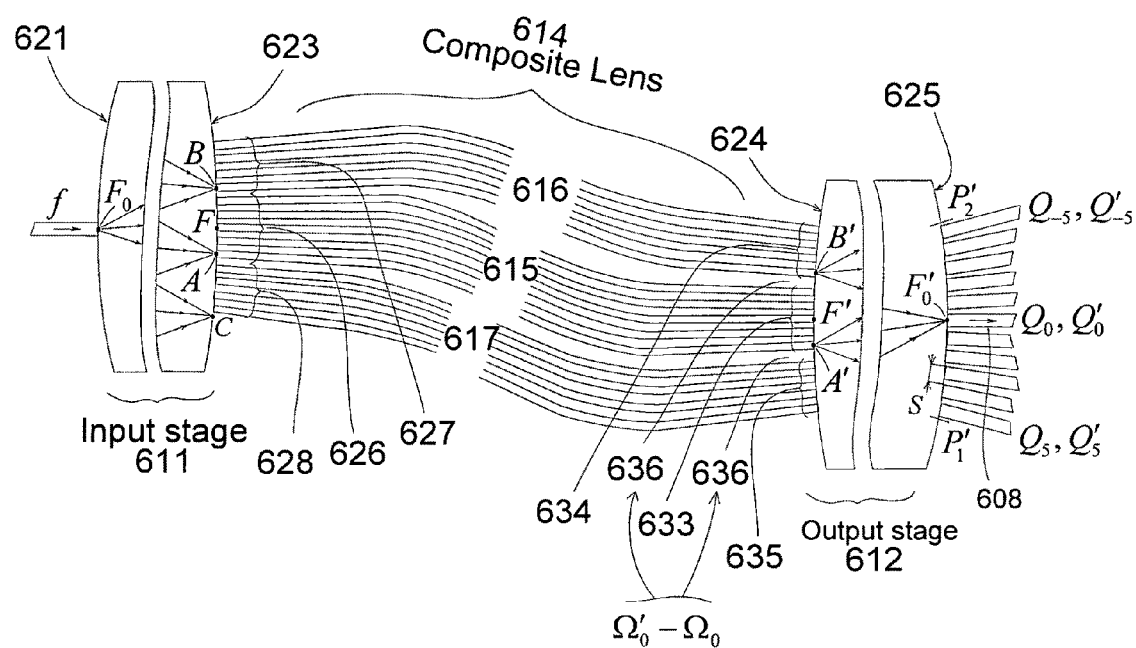
FIG. 6 shows a router including a composite lens with three separate apertures 634, 633, 635 separated by small matching gaps 636.

This condition will be shown to solve two problems. First, the output images $I'_i$ in the new arrangement are now closely spaced and, as a consequence, the size of the output stage is substantially reduced as compared to FIG. 3. Second, the loss caused in FIG. 3 by unwanted secondary images produced by the first stage can now be essentially eliminated in most cases. To this purpose, it is now sufficient to include, between the two stages, a composite lens providing efficient transmission of both principal and secondary images as shown in FIG. 6. The composite lens consists of three lenses 616, 615, 617, and it is characterized by three separate output apertures 634, 633, 635. As shown in FIG. 6, the two secondary apertures 634 and 635 are separated from the principal aperture 633 by suitable matching gaps 636. For typical design parameters, it will be shown that this technique substantially reduces the loss caused by secondary images, and the router is then characterized, in each output waveguide, by nearly ideal (rectangular) response of width approximately equal to the channel spacing (equal to $\Delta f$). Note this technique would not be feasible in the prior art arrangements. Another property of the new design is that the free-spectral ranges of the two stages in FIG. 4 are smaller, by a factor larger than N, than the values in the prior art arrangement using N lenses. As a consequence, the orders of the two stages are correspondingly larger, by the same factor, and this will improve in FIG. 4 the router efficiency, for it will reduce imaging errors as shown by equation (21). The larger orders will also result in a folded geometry as in FIG. 9, thus reducing the length of the router, as compared to previous arrangements. In the following, it will be assumed for simplicity that one of the output waveguides is located at the output focal point. However, as shown later, the design can be readily generalized, without this restriction, by anyone skilled in the art.

In the following, the center frequency $f'_0$ of the second grating (not shown in FIG. 4) will be chosen equal to the center frequency $f_0$ of the first grating, thus causing an input signal of frequency $f_0$ to be transmitted in FIG. 4 to the output focal point $F'_0$ of the second grating. Notice the same relations specifying the characteristic frequencies $f_i$ of the first grating also apply to the characteristics frequencies $f'_i$ of the second grating. Thus, $$f'_i = f_0 + i\Delta f', Q'_i = Q'_0 + i \qquad (8)$$

where the central period $\Delta f'$ (the free-spectral range) of the second grating is given by $$\Delta f' = \frac{f_0}{Q'_0} = \frac{f'_i}{Q'_i} \qquad (9)$$

and $Q'_i$ denotes the order corresponding to the characteristic frequency $f'_i$. Finally, it will be shown that the wavelength derivative of an output image is the sum of two contributions, respectively caused by the derivative D at the output of the first stage, and by the contribution $$D' = Q'\frac{\Omega'}{\lambda} \qquad (10)$$

caused by the second stage, characterized by input central zone width $\Omega'$.

In the following description, it will be assumed, for simplicity, that the lens is characterized by unity magnification, so that the input and output circles 423,424 of the lens are characterized by the same waveguide spacing. Similarly, it will be assumed that each stage is characterized by unity magnification, so that the input and output zones of each stage have the same width. Note the above magnifications (of the lens and the two stages) do not affect the router performance. They are only assumed to simplify the design formulation. Then, a simple expression is obtained for the wavelength derivative of each output image. By assuming unity magnifications, this derivative becomes equal to the difference D'−D, where the two parameters D and D' are the contributions from the two stages, and D' is given by expression (10). Stationary imaging is therefore realized by simply specifying D'=D and one obtains, in the vicinity of the center frequency $f_0$, the condition $$q = \frac{\Omega'}{\Omega} = \frac{Q_0}{Q'_0} = \frac{\Delta f'}{\Delta f} \tag{11}$$

where $\Omega/\Omega'$ is a constant, frequency independent, and therefore the above condition is equivalent to $$\frac{\Omega_0}{\Omega'_0} = \frac{Q'_0}{Q_0} \tag{12}$$

where $\Omega_0$, $\Omega'_0$ the values of $\Omega$, $\Omega'$ at the center frequency $f_0$.

The router behavior in FIG. 4 can be summarized as follows. Each passband is centered at a particular characteristic frequency $f_i$ of the input stage, and its width is equal to the free-spectral range of the first stage. Thus, the i-th passband covers the interval $$|f - f_i| \le \frac{\Delta f}{2} \tag{13}$$

In this interval, an input signal applied to the router will produce, on the output focal circle 425, a stationary image $I'_i$ at the location of the i-th output waveguide. Indeed the input signal will be first transformed, by the i-th cycle of the first stage, into an image $I_i$ of order $Q_i$. Next, this image will be transferred by the waveguide lens to the second stage, whose i-th cycle of order $Q'_i$ will then produce the output image $I'_i$. Therefore the router response to an input signal of variable frequency is a sequence of stationary images $I'_i$, each produced by a different cycle (a different order $Q_i=Q_0+i$) of the input stage. Moreover, one can verify (see Equations 11,17) that the spacing of the images $I'_i$ is determined by the parameter q, and it is substantially equal to $$\Omega' - \Omega = (q-1)\Omega$$

which shows that the spacing would be zero in FIG. 4 if one would choose q=1, and the images $I_i'$ would then be all produced at the same location, namely at the focal point $F_0'$. Accordingly, the value of q in FIG. 4 is instead chosen slightly greater than unity, so that the output images are properly displaced from each other, as required in order to insure negligible coupling between adjacent images. Also note, from Equation. 11, that the parameter q is simply equal to the ratio $Q_0/Q_0'$ between the diffraction orders of the two stages. Therefore, by properly choosing this ratio, the spacing between adjacent waveguides will be large enough to prevent mutual coupling. The arrangement will then be characterized by a sequence of N output passbands, respectively transmitted to the sequence of N output waveguides, and the i-th passband will be characterized by different diffraction orders $Q_i=Q_0+i$ and $Q_i'=Q_0'+i$ that monotonically increase from each output waveguide to the next. In other words, said sequence of N passbands, produced by a sequence of N consecutive orders $Q_i$ of the input stage, will be characterized by a sequence of N consecutive orders $Q_i'$ of the output stage.

Figure 5:
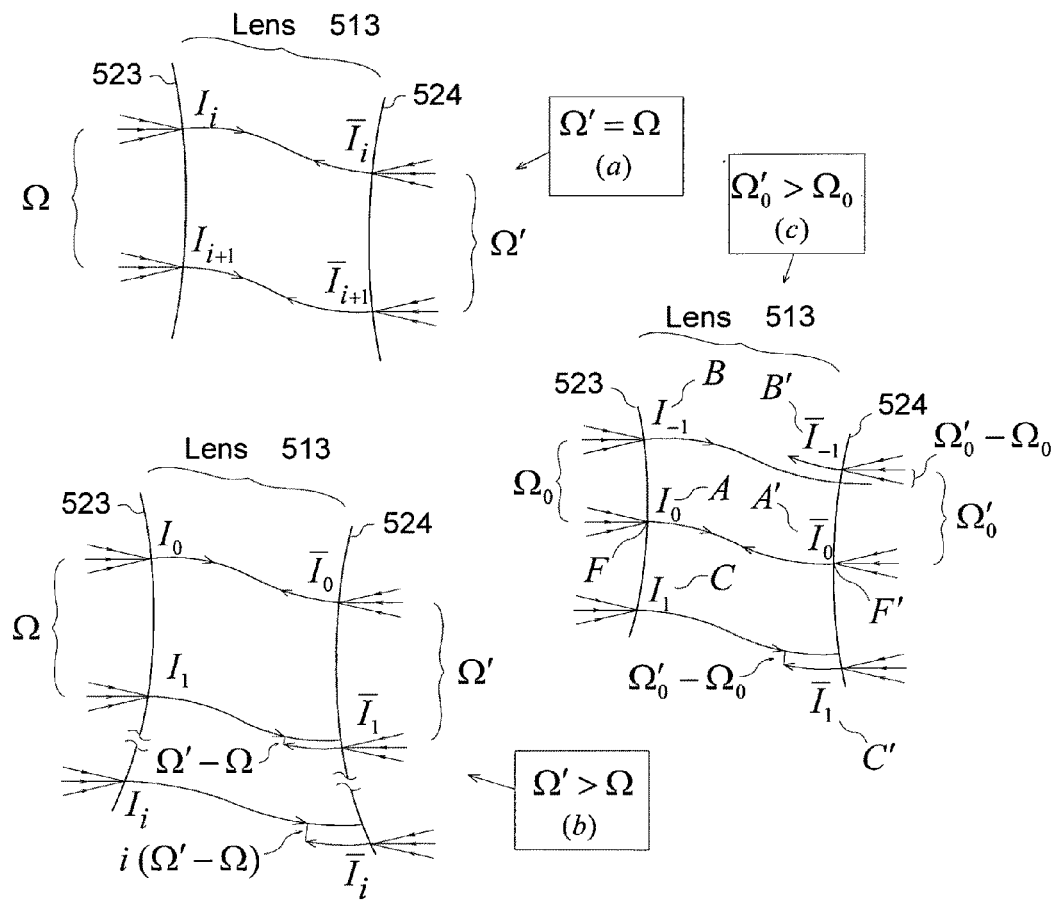
FIG. 5 shows the images produced by simultaneously applying (in opposite directions) the same frequency to the foci $F_0$ of $F'_0$ of the router of FIG. 4. In all cases the lens apertures are assumed to be very large. The first example (a) assumes $\Omega'=\Omega$, and therefore the images are produced at corresponding locations of the two focal curves 523 and 524. In the second example (b), corresponding images are instead displaced from each other by $i(\Omega'-\Omega)$. The third example (c) shows the errors $\Omega'_0-\Omega_0$ that would arise in FIGS. 6, 7 without including suitable matching gaps 636, 736. Note the above properties directly follow from FIG. 2.

The new router design is best understood by initially considering an idealized arrangement, obtained by neglecting the losses in the two stages, by assuming that the lens aperture is large enough to accept all significant images and, finally, that the router in FIG. 4 is a symmetric arrangement consisting of two identical stages characterized by $Q'_0=Q_0$ so that $$\Omega'=\Omega$$

because of condition (11). Under the above conditions, an input signal applied to the input focal point $F_0$ will be entirely transferred to the output focal point $F'_0$. To verify this result, let a particular frequency f be simultaneously applied to both foci $F_0$ and $F'_0$, thus producing in the router two signals propagating in opposite directions. The two signals will then produce, over the two circles 423 and 424 of the lens, two sets of images $I_i$ and $\bar{I}_i$, respectively characterized by orders $Q_i$ and $Q'_i$, and the two sets will perfectly match each other as shown in FIG. 5 by insert (a) characterized by $\Omega'=\Omega$. In other words, corresponding images $I_i$ and $\bar{I}_i$ are produced at corresponding locations on the two circles 523,524. This implies, according to a well known reciprocity theorem, that all images $I_i$ produced by the input signal applied to $F_0$ will be transmitted, by the output stage, to the output focal point $F'_0$. The arrangement of FIG. 4 is thus characterized for $\Omega'=\Omega$ by lossless transmission to $F'_0$. However, this arrangement is not a router, since all frequencies are transmitted to the same output location $F'_0$, thus producing a single stationary image. Accordingly, in this patent the ratio $q=\Omega'/\Omega$ in FIG. 4 is chosen slightly greater than unity, so as to split the image produced at $F'_0$ into a set of r separate images. To obtain this result, the order $Q'_0$ of the output stage in FIG. 4 is chosen smaller than $Q_0$, $$Q'_0 = Q_0\left(1 - \frac{1}{r}\right) \tag{14}$$

thus obtaining from expressions (3,9,11)

$$\Omega = \Omega'\left(1 - \frac{1}{r}\right) \tag{15}$$

and $$r\Delta f = (r-1)\Delta f' \tag{16}$$

where $\Delta f$ is (the free-spectral range determined by) the frequency width of each cycle of the input stage, and similarly $\Delta f'$ is the width of each output cycle of the output stage. The above expression implies in view of conditions (2,8) that the characteristic frequencies $f_i$ and $f'_s$ of the two stages periodically coincide for $$f_{hr}=f'_{h(r-1)}$$

where h is an arbitrary integer. At each of these frequencies, the arrangement periodically produces at the focal point $F'_0$ a stationary image, which is repeated periodically with period equal to $r\Delta f$. Accordingly, this implies that the central transmission coefficient between the two foci $F_0$ and $F'_0$ is periodic, with each period equal to an integer multiple of both $\Delta f$ and $\Delta f'$. Moreover, since the period $r\Delta f$ includes r cycles of the input stage, the arrangement produces in each period (a sequence of r cycles) a total of r output stationary images, approximately spaced by Ω'/r in the output central zone. Therefore, at these r locations, a total of r output waveguides can be included in the output central zone.

Next, let the aperture width of the lens in FIG. 4 be initially chosen essentially equal to the central zone width Ω of the first stage, thus blocking the secondary images. Later on, however, the lens aperture will be increased, to provide efficient transmission of both principal and secondary images.

Under the above conditions, the arrangement of FIG. 4 has the following properties. At each characteristic frequency $f_i$, the input stage produces an output image $I_i$ located at the center F of the lens aperture 441, and the second stage then produces an output image $I'_i$ of order $\Omega'_i$. In particular, since both stages are characterized by the same center frequency $f_0$, the output image $I'_0$ produced at $f_0$ is located at the output focal point $F'_0$. Moreover, here we assume condition (12). This causes the image $I'_0$ to be stationary in the vicinity of $f_0$, and therefore efficient power transfer to the central waveguide located at $F'_0$ is realized in the entire passband for $$|f - f_0| \leq \frac{\Delta f}{2}$$

Next, consider the output image $I'_i$ produced by $f_i$. The image $I_i$ produced by the first stage is again located at the center of the lens aperture, since $f_i$ is a characteristic frequency of the input stage. However, the characteristic frequency $f'_i$ of the second stage now differs from $f_i$, and therefore one can verify that $I'_i$ is now displaced from the output focal point $F'_0$ by $$i(\Omega' - \Omega), \text{ for } f = f_i \quad (17)$$

To verify this result, it is convenient to assume that the lens apertures 441 and 442 are very large (much larger than shown in FIG. 4). Then consider the two sets of images produced, on the lens focal circles 423,424 of FIG. 4, by simultaneously applying (in opposite directions) the same frequency f to both focal points $F_0$ and $F'_0$ of the two stages. Since $Q_0 > Q'_0$, equation (11) implies $\Omega' > \Omega$ and therefore the two sets of images are characterized by different spacings, respectively $\Omega'$ and $\Omega$ as illustrated by insert (b) of FIG. 5. As a consequence, the i-th image $I_i$ for $i \neq 0$ is displaced from $I_i$ by an integer multiple $i(\Omega' - \Omega)$ determined by the difference $\Omega' - \Omega$ between the two spacings. It is recalled that previously, for $\Omega' = \Omega$, the two sets of images perfectly matched each other, as shown by insert (a) in FIG. 5, and in that case each image $I_i$ was transferred in FIG. 4 to the output focal point $F'_0$. Now instead, each image $I_i$ of insert (b) in FIG. 5 will produce in FIG. 4 an output image displaced from the focal point $F'_0$ by $i(\Omega' - \Omega)$. Thus, in order for each frequency $f_i$ to be transferred to an output waveguide, the output waveguide must be displaced from the focal point $F'_0$ by the value of $i(Q' - \Omega)$ at $f_i$.

Notice the output image $I'_0$ produced in FIG. 4 at the output focal point $F'_0$ is stationary. Indeed, $I'_0$ is characterized at all frequencies by D'−D=0, because of equation (11) and the fact that $\Omega'/\Omega$ is frequency independent. Moreover, since $I'_0$ is stationary, this can be shown to be also true, to a good approximation, for all other images $I'_i$ in FIG. 4, and the error will be given later.

Composite Lens

As pointed out earlier, only a fraction of the output power in FIG. 1 is transferred to the principal image A. The remaining power is primarily transferred to the secondary image B that is closest to the principal zone $P_1P_2$, and the resulting loss is typically an increasing function of the distance of B from the focal point F.

This loss variation is highly undesirable in FIG. 4 since it causes a corresponding variation in each passband, particularly in the vicinity of the passband edges. The above loss can be substantially reduced by the techniques described in U.S. Pat. No. 7,068,888 issued on Jun. 27, 2006, and U.S. Pat. No. 6,873,766 issued on Mar. 29, 2005, but these techniques are only effective in the central region of the principal zone and, furthermore, they require a longer focal length, which increases the size of each stage.

Here, the above loss is best eliminated by a different technique, by simply including between the two stages a composite lens with several output apertures, providing efficient transmission (to the second stage) of all important images (namely the principal image and at least one secondary image). These images are then efficiently recombined by the output stage into a single stationary image, transmitted to a particular output waveguide.

As shown in FIG. 6, the new technique requires the use, between the two stages, of a composite lens 614 consisting of three waveguide lenses, namely a principal lens 615 and two secondary lenses 616 and 617. The composite lens is connected between the focal circles 623 and 624 of the two stages. On the input circle 623, the lens includes, in addition to a principal aperture 626 covering the principal zone of the input stage, two secondary apertures 627, 628, whose purpose is to provide efficient transmission, to the output stage, of the secondary images closest to the principal image. Typically, the most important secondary image is the one closest to the central zone. This secondary image alternates, in each cycle of the principal image, from one secondary aperture to the other. Thus, each secondary aperture need only cover about half of each cycle, and the required aperture width is then about half of the central aperture width.

Notice, at the input of the composite lens, the three apertures 626, 627, 628 are joined together, whereas, at the output, the three apertures 633, 634, 635 are separated by small matching gaps 636. These gaps are needed, as shown later, in order to insure that the spacing in FIG. 6 between the principal image A' and the secondary image B' accurately matches the spacing Q' required by the second stage. The lens design is primarily determined by two parameters, namely the central zones widths $\Omega_0$ and $\Omega'_0$ of the two stages at the center frequency $f_0$. The width of the central aperture of the lens is chosen equal to $\Omega_0$. On the other hand, the width of each secondary aperture is chosen appreciably smaller, typically slightly larger than $\Omega_0/2$. Finally, the matching gaps 636 will be chosen equal to the difference $\Omega'_0 - \Omega_0$, which is determined by the parameter r since from condition (15)

$$\Omega'_0 = \frac{r}{r-1}\Omega_0 \quad (18)$$

Figure 7:
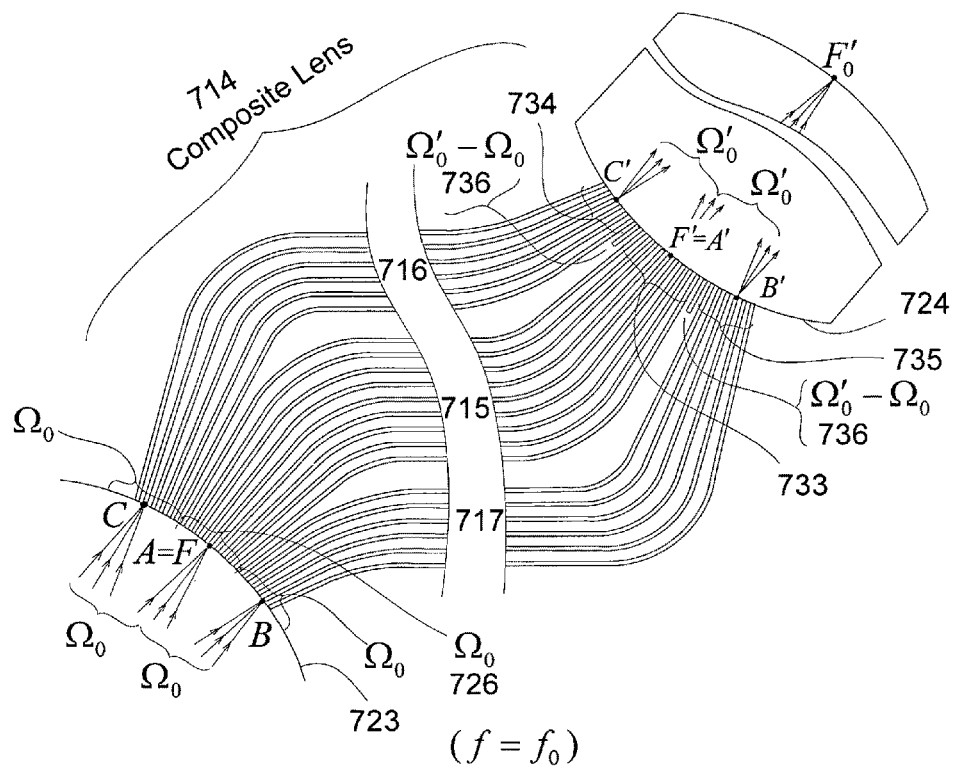
FIG. 7 shows the images produced by the router of FIG. 6 at the center frequency $f_0$.

Note in both examples of FIGS. 6 and 7 the input frequency is assumed inside the central passband, $$|f - f_0| \leq \frac{\Delta f}{2}$$

and therefore the output image is transferred in both cases to the waveguide connected to the focal point $F'_0$. In FIG. 6, the principal image A is shown close to the bottom edge of the central zone, and in this case only one of the two secondary images B and C is produced inside the lens aperture. FIG. 7 shows instead the images produced at the center frequency $f_0$. In this case, the principal image A is located at the focal point F, and the two secondary images B and C are symmetrically located at a distance $\Omega_0$ from F. Therefore, as pointed out earlier, the secondary apertures must be slightly larger than $\Omega_0/2$, in order to include both secondary images. Next consider the images A', B', C' produced on the output circle 724 of the lens. In order for these images to be transformed by the output stage into a single stationary image, their spacing must be equal to the central zone width $\Omega'_0$ of the output stage, as shown later. As a consequence, since according to equation (18) the spacing $\Omega'_0$ is larger than the input spacing $\Omega_0$, the three output apertures must be separated by small matching gaps 736 of width $\Omega'_0 - \Omega_0$ as indicated in FIGS. 6, 7. Once this condition is satisfied, the three images will be efficiently recombined by the output stage, and they will essentially produce a single stationary image, located in FIG. 7 at the output focal point $F'_0$. By this technique, the loss caused by secondary images is essentially eliminated, in the entire passband centered at $f_0$. Moreover, if the order $Q_0$ is large enough, one can show that the above loss is also eliminated in the remaining passbands (of orders $Q_i \neq Q_0$).

As pointed out earlier, the spacing of the images produced (at the center frequency $f_0$) on the output focal circle 724 of the lens must be equal to the central zone width $\Omega'_0$ of the output stage. The reason for this condition is best understood by reversing the sense of transmission. Then, by applying an input signal to the focal point $F'_0$ of the lens, the images produced on the focal circle 724 are spaced by $\Omega'_0$. This implies, by reciprocity, that efficient transmission by the router (from the input focal point $F_0$ to the output focal point $F'_0$) can only be realized if the three images A', B', C' in FIG. 7 are equally spaced by $\Omega'_0$. In other words, their spacing must match the spacing $\Omega'_0$ obtained by reversing the sense of transmission. Another condition that must be satisfied is that the secondary images must have similar intensities in both cases. In other words, the same design must be used for the periodic arrays of the two gratings. Notice, once the above conditions are satisfied at the center frequency of the router, they will be satisfied accurately at all frequencies of interest, provided that the values of $Q_0$ and r are large enough.

Next, in order to better understand the matching gaps 736, consider the loss that would occur, without matching gaps, by simply choosing the lens aperture in FIG. 4 large enough to accept both principal and secondary images. Thus, consider in FIG. 4 the images produced, over the lens aperture, by simultaneously applying the center frequency $f_0$ to both foci $F_0$ and $F'_0$. Then, as shown by insert (c) of FIG. 5, a perfect match is obtained between $I_0$ and $I'_0$, but the secondary images $I'_{\pm 1}$ are displaced from $I_{\pm 1}$ by $\Omega'_0 - \Omega_0$. Because of this displacement, the secondary images $I_{-1}, I_1$ are not transmitted to the intended output waveguide, which in this case is located in FIG. 4 at the focal point $F'_0$. The resulting loss is substantially eliminated by the technique of FIG. 7, by including between the two stages a composite lens 714 with suitable matching gaps 736 removing the imaging errors $\Omega'_0 - \Omega_0$ shown by insert (c) of FIG. 5. The lens output aperture is then split into three separate apertures, separated by matching gaps 736 chosen equal to $\Omega' - \Omega$ at the center frequency $f_0$. By this technique, the secondary loss caused by the two secondary images $I_{-1}, I_1$ is substantially removed at the center frequency $f_0$. Moreover, once the secondary loss is removed for $f=f_0$, one can show that it will be also removed at all other frequencies of interest, provided that the ratio $$\frac{N}{Q_0}$$

is appreciably smaller than unity, as shown later. As pointed out earlier, the required input aperture of the lens in FIG. 7 must be slightly wider than twice the width $\Omega_0$ of the central zone, in order for all three images A, B, C to be transferred to the second stage.

Next consider the errors caused by the frequency variation of the central zone width $\Omega$. Because of this variation, the i-th output image for $i \neq 0$ is not exactly stationary. As a consequence, $I'_i$ is found to be slightly displaced in FIG. 4 from the intended waveguide, and the displacement $\delta_i$ at the passband edges is approximately equal to $$\left|\frac{\delta_i}{w_\phi}\right| \simeq \left|\frac{i}{2Q_0}\right| \tag{21}$$

where the width $w_\phi$ of the waveguide mode is assumed to be essentially equal to the waveguide spacing S, as shown in FIG. 1. From the above expression, in order to insure that the loss caused by $\delta_i$ is negligible for all output waveguides, one must require approximately $$\left|\frac{N-1}{4Q_0}\right| < \frac{1}{10} \tag{22}$$

Figure 9:
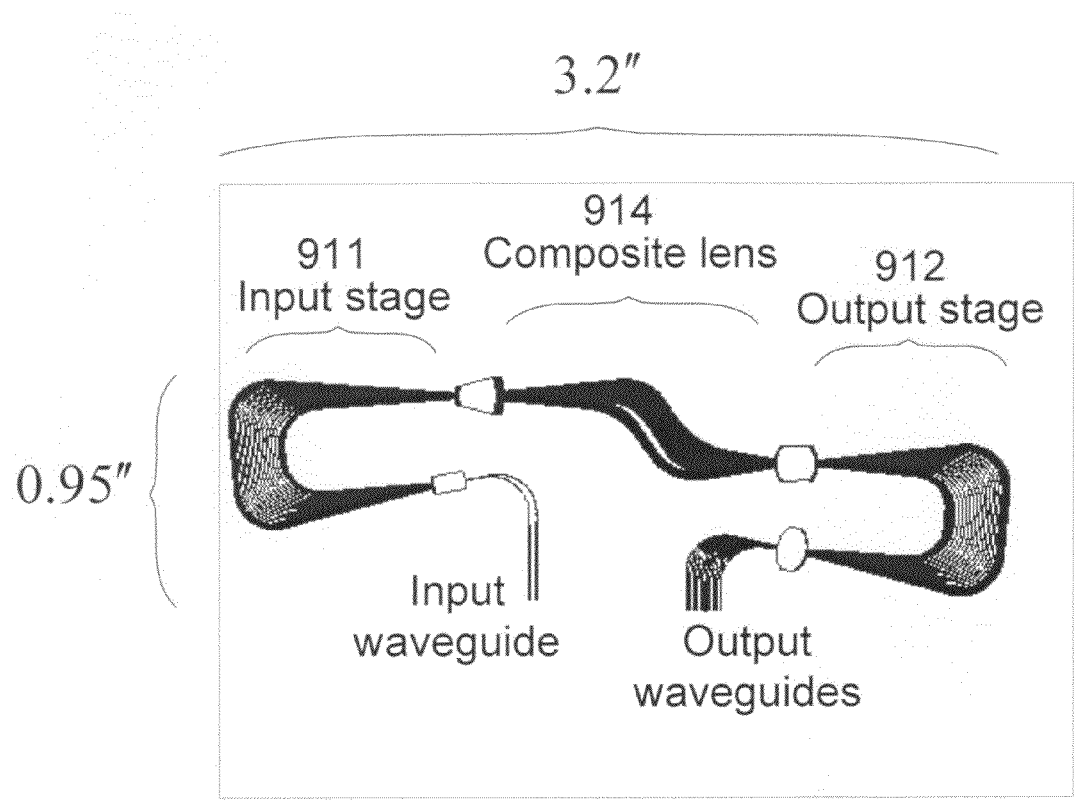
FIG. 9 shows the layout of a 1×16 router realized by using the arrangement of FIG. 6.

For instance, in the application of FIG. 9 where the channel spacing is 800 GH$_z$ and N=16 one obtains approximately $Q_0$=250 and $$\left|\frac{N-1}{4Q_0}\right| \leq \frac{1}{62} \tag{23}$$

and therefore the error in this case is entirely negligible. However, the variation of $\Omega'$ also affects the performance of the composite lens of FIG. 7. Then, for the secondary images, one finds that the error $\delta_i$ increases by a factor 3, but the error is again negligible for the applications considered here.

It is important to realize that the above results only apply to the optimized arrangements proposed by this patent. One can show that the above errors are proportional to the difference $\Omega' - \Omega$, and they are inversely proportional to the order of the output stage. As a consequence, they are minimized by the present design, since $\Omega' \approx \Omega$ and the orders of both stages are very large. Note the composite lens would not be feasible in the prior art arrangements. For instance, in FIG. 3, the required matching gaps $\Omega'_0 - \Omega_0$ would be very large (larger than $\Omega_0$) and the resulting errors $\delta_i$ would be too large.

The expression (21) is derived as follows. Consider the two images $I_i$ and $I'_i$ produced, over the two lens apertures in FIG. 4, by simultaneously applying the same input signal (in opposite directions) to the two gratings. In order for the two images to be perfectly matched by the lens, they must be characterized by the same derivatives. By then requiring D−D'=0, one obtains for the i-th passband the condition $$\frac{\Omega'_0}{\Omega_0} = \frac{Q_i}{Q'_i} \quad (24)$$

and, once this condition is satisfied for i=0 as required by condition (12), one obtains for i≠0 a small error $\delta D_i = D'_i - D_i$, which will cause in FIG. 4 a corresponding displacement $\delta_i$ of the output image from the intended waveguide. The displacement $\delta_i$ is readily calculated, and one obtains the expression (21).

Next, it is important to realize that the particular design considered so far can be modified in various ways without changing the substance of the results. In particular, it was assumed so far that one of the output waveguides is centered at the focal point. Moreover, for this particular waveguide, the router transmission coefficient was assumed to be exactly periodic. Also, an integer value of r was assumed. These choices, although desirable in some cases, can be modified without affecting the basic properties of the arrangement of FIG. 4, as discussed next.

So far, the same center frequency $f_0$ was assumed for the two stages, in which case one of the output waveguides is located at the output focal point $F'_0$ and one can realize in this case a 1×N router with an odd number N of waveguides, symmetrically located with respect to the focal point $F'_0$. More generally, an even number N may be preferable, in which case the characteristic frequencies of the output stage must be shifted by $\Delta f/2$, with respect to those of the input stage. Also note r can be negative, and it need not be an integer. However, $Q'_0$ must be an integer, and therefore the ratio $Q_0/r$ must be an integer in equation (14). Here r was assumed to be an integer because the transmission coefficient between $F_0$ and $F'_0$ is then periodic, and this will then be also true, approximately, for the other transmission coefficients.

Finally, by reversing the sense of transmission and applying the input signal to the focal point $F'_0$ one can verify that the router of FIG. 4 will produce on the circle 421 a set of r−1 stationary images. In this case the number r−1 of stationary images is smaller than r because the output central zone width is now $\Omega$, and it is therefore now smaller than the input zone width, which is now $\Omega'$. Moreover, the passbands are now centered at the characteristic frequencies $f'_i$, which are slightly different from the characteristic frequencies $f_i$. The above properties, obtained by reversing the propagation direction in FIG. 4 have two important consequences.

First, a router similar to that of FIG. 4 can be realized by reversing in FIG. 4 the sense of transmission, by connecting the N output waveguides to the focal circle 421, and connecting the input waveguide to the focal point $F'_0$. Then, an input signal applied to the input focal point $F'_0$ will produce on the circle 421 a set of r−1 stationary images. Therefore, by properly choosing the locations of the N waveguides on this circle, the result will be a 1×N router, with properties similar (except that r is now replaced by r−1) to those derived previously. In particular, one obtains again equations (6, 7), except that now $\Delta f$ represents the output free-spectral range, and $\Delta f'$ represents the input free-spectral range. Moreover, since the two stages 612 and 611 respectively become the input and output stage, the matching gaps 636 are now included in the lens aperture connected to the input stage 612.

The second consequence is obtained by replacing the input waveguide in FIG. 4 with M input waveguides, each placed at the location of one of the above r−1 stationary images (obtained previously by reversing the sense of transmission). One then obtains a N×M router with the property that an input signal applied to the focal point $F_0$ will produce N passbands in the forward direction, whereas an input signal applied to the focal point $F'_0$ will produce M passbands in the reverse direction. Moreover, by applying input signals to all the M waveguides connected to the input circle 421, one obtains in the forward direction a total of MN transmission coefficients. Then, if the orders $Q'_0$ and $Q_0$ are large enough, one can verify that the above MN transmission coefficients are characterized by maximally flat passbands, and a similar result is obtained in the reverse direction. To conclude, one can realize for the first time, by using the imaging arrangement of FIG. 4, an M×N router with maximally flat passbands providing full connectivity between the input and output waveguides.

Figure 8:
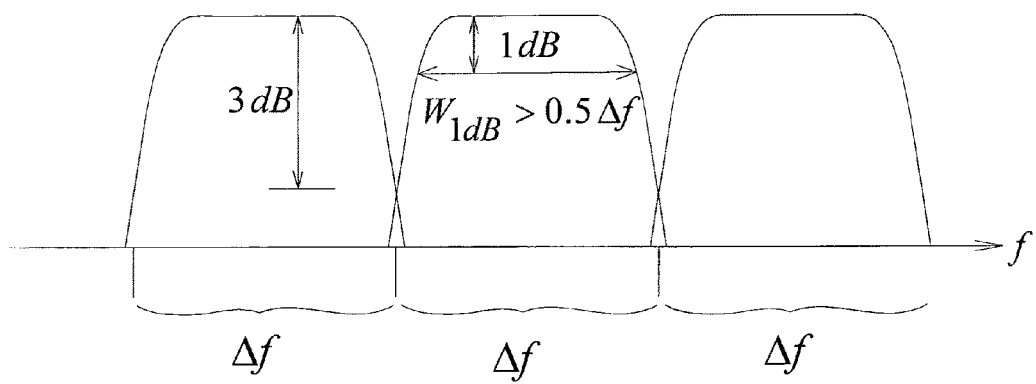
FIG. 8 shows typical parameters of the passbands produced by the arrangement of FIG. 4. Note the channel spacing is equal to the free-spectral range $\Delta f$ of the input stage.

FIG. 8 shows a set of maximally flat passbands of the type realized in this invention. Each passband features a maximally flat region, and its 1 dB width typically occupies more than 50% of the channel spacing, which is simply equal to the free-spectral range $\Delta f$ the first stage. Moreover, the 3 dB width is approximately equal to the channel spacing.

FIG. 9 shows the mask layout of a 1×16 router realized by using the arrangement of FIG. 6. In this example r=20, the channel spacing is 800 GHz, and the number of output waveguides N=16 is smaller than r because only the central region (about 80%) of the output central zone is occupied by the N waveguides. The folded geometry of FIG. 9 is a consequence of the large orders of the two stages in FIG. 4. Also note that the 1 dB width in this case is nearly equal to the channel spacing. The above example assumes an effective refractive index contrast of 0.6%. Note, for greater clarity, some of the intermediate waveguides in each grating are removed in FIG. 9.

Note, in an actual design, dummy waveguides will be included in each lens or grating but they are omitted for simplicity in FIGS. 1, 3, 4, 6, 7. Dummy waveguides will also be included in the gaps 636 of FIG. 6, as shown in FIG. 7.

The New Design

According to equations (6,7) the new design is characterized by $$q = \frac{\Delta f'}{\Delta f} = 1 + \frac{\gamma}{N} \quad (25)$$

where $\Delta f'$ and $\Delta f$ are the free-spectral ranges of the two stages and $\gamma$ is the ratio $N/N_{max}$ between the number N of output waveguides and the largest N allowed by the output central zone width As compared to the prior art using N lenses, here only one lens is required. Moreover, an advantage of the present invention is that the loss variation caused in each passband by secondary images can be substantially reduced (for the first time) by using the composite lens of FIG. 7. Moreover, here the free-spectral ranges $\Delta f$ and $\Delta f'$ are smaller, by about a factor 2N. The orders of the two stages are therefore correspondingly larger, by the same factor. This property improves the router efficiency, it reduces imaging errors as shown by equation (21), and it is responsible for the folded geometry of FIG. 9, which reduces the length of the router, as compared to previous arrangements. Note both the i-th output image coordinate i($\Omega'-\Omega$) and the orders $Q'_i$ and $Q_i$ are monotonic functions of the index i. Therefore, the new design has the distinctive property that the diffraction orders $Q'_i$ and $Q_i$ of the output images vary monotonically (either increasing, or decreasing) from each output waveguide to the corresponding next. Instead, in the prior art, all output images were produced by the same order a of the output stage.

As pointed out earlier, a router similar to that of FIG. 4 can be realized by reversing in FIG. 4 the sense of transmission, by connecting the N output waveguides to the focal circle 421, and connecting the input waveguide to the focal point $F'_0$. Then, one obtains again equations (6, 7), except that now $\Delta f$ represents the output free-spectral range, and $\Delta f'$ represents the input free-spectral range. Moreover, since the two stages 612 and 611 respectively become the input and output stage, the matching gaps 636 are now included at the lens junction with the input stage. Note, in the general case where the lens in FIG. 6 is not characterized by unity magnification, the width of the matching gaps 636 is equal to $$\Omega'_0 \left(1 - \frac{\Delta f}{\Delta f'}\right) \qquad (26)$$

where $\Omega'_0$ is the width of the central zone on the focal circle 624. In the special case where the lens is characterized by unity magnification, the above expression becomes equal to $|\Omega'_0 - \Omega_0|$ since then $\Delta f/\Delta f' = \Omega/\Omega' = \Omega_0/\Omega'_0$.

Note from condition (25)

$$1 < \frac{\Delta f'}{\Delta f} < 1 + \frac{1}{N} \qquad (27)$$

What is claimed is:

1. A planar optical router formed by a planar imaging arrangement comprising:
   an input stage formed by a first waveguide grating router connected to at least one input waveguide;
   an output stage formed by a second waveguide grating router connected to N output waveguides, wherein N is an integer greater than one;
   a waveguide lens consisting of a plurality of waveguides connected between the input stage and the output stage;
   said input and output stages have substantially opposite dispersions, so that said planar imaging arrangement is characterized by a sequence of N passbands respectively transmitted to said N output waveguides; wherein
   the diffraction orders of said two gratings have a property that both diffraction orders vary monotonically from one passband to a next passband in the sequence of N passbands.

2. A planar optical router formed by a planar imaging arrangement comprising:
   an input stage formed by a first waveguide grating router connected to at least one input waveguide;
   an output stage formed by a second waveguide grating router connected to N output waveguides, wherein N is an integer greater than one;
   a plurality of waveguides connected between the input stage and the output stage;
   said input and output stages have substantially opposite dispersions, so that said planar imaging arrangement is characterized by a sequence of N passbands respectively transmitted to said N output waveguides; wherein
   said plurality of waveguides are arranged in the form of a composite lens consisting of a principal lens and two secondary lenses connected between said input stage and said output stage, wherein said principal lens provides transmission between the principal zones of the two stages, and the two secondary lenses provide transmission outside said principal zones; and the diffraction orders of said two gratings of said input and output stages have a property that both diffraction orders vary monotonically from one passband to a next passband in the sequence of N passbands.

3. The planar optical router as recited in claim 2, wherein one of the two stages is characterized by free-spectral range larger than that of the other stage; and
   the three lenses forming the composite lens are characterized, at their connections to said stage having larger free-spectral range, by three separate apertures that are separated by matching gaps reducing the loss caused by secondary images.

4. The planar optical router as recited in claim 3, wherein said matching gaps are substantially equal to:

$$\Omega'_0 \left(1 - \frac{\Delta f}{\Delta f'}\right) \qquad (26)$$

where the two parameters $\Delta f$ and $\Delta f'$ are the free-spectral ranges of the input and output stages, $\Delta f'$ is larger than $\Delta f$, and the parameter $\Omega'_0$ is substantially equal to the principal zone width at the connection of the principal lens with the stage having free-spectral range $\Delta f'$.

5. The planar optical router as recited in claim 2, wherein the ratio $Q_0/Q'_0$ of the diffraction orders $Q_0$ and $Q'_0$ of the input and output stages at a center design frequency $f_0$ is chosen close to unity, and said ratio is properly chosen so as to minimize the output waveguides spacing without causing substantial mutual coupling between adjacent output waveguides.

6. The planar optical router as recited in claim 2, wherein the router includes an input set of M input waveguides and an output set of N output waveguides; and
   the N transmission coefficients from each waveguide of the input set to the N waveguides of the output set are substantially characterized by maximally flat passbands.

7. The planar optical router as recited in claim 3, wherein the free-spectral ranges $\Delta f'$ and $\Delta f$ of the two stages satisfy the condition $$1 < \frac{\Delta f'}{\Delta f} < 1 + \frac{1}{N} \qquad (27)$$

and $\Delta f'$ is larger than $\Delta f$.

* * * * *